INVENTORS.
ROBERT A. STEIN AND
WILLIAM H. ROBERTSON.
BY
Dybvig & Dybvig
Their Attorneys.

July 6, 1954 R. A. STEIN ET AL 2,682,779
ADJUSTABLE GEARING
Filed May 27, 1950 2 Sheets-Sheet 2

INVENTORS.
ROBERT A. STEIN AND
WILLIAM H. ROBERTSON.
BY Dybvig & Dybvig,
Their Attorneys.

Patented July 6, 1954

2,682,779

UNITED STATES PATENT OFFICE 2,682,779

ADJUSTABLE GEARING

Robert A. Stein and William H. Robertson, Dayton, Ohio, assignors to The Globe Industries, Inc., Dayton, Ohio, a corporation of Ohio Application May 27, 1950, Serial No. 164,808

11 Claims. (Cl. 74—411)

This invention relates to aeronautical apparatus and more particularly to an actuator for the control surfaces of a plane wherein the actuator is provided with means for adjusting and limiting the force applied to the control surface.

Thus, it is an object of this invention to provide an actuator which includes an adjustable load responsive clutch having an improved arrangement for adjusting the pressure between the clutch surfaces.

One of the problems of designing actuators of this type is that it is necessary to take into consideration compactness, as well as such factors as accuracy in operation, durability, adjustability, et cetera.

Our invention contemplates using relative rotation between two parts for adjusting the frictional engagement between two friction surfaces and to provide an improved arrangement for holding one of the two parts against rotation while the other is rotated relative thereto.

Another object of this invention is to provide an actuator which may be manufactured at a low cost and yet be dependable and efficient in operation.

Other objects and advantages reside in the construction of parts, the combination thereof and the mode of operation, as will become more apparent from the following description.

In order to illustrate our invention without unduly complicating the disclosure by showing a large number of reduction gears and the like, we have illustrated a simplified type of actuator mechanism incorporating our invention.

Figure 1:
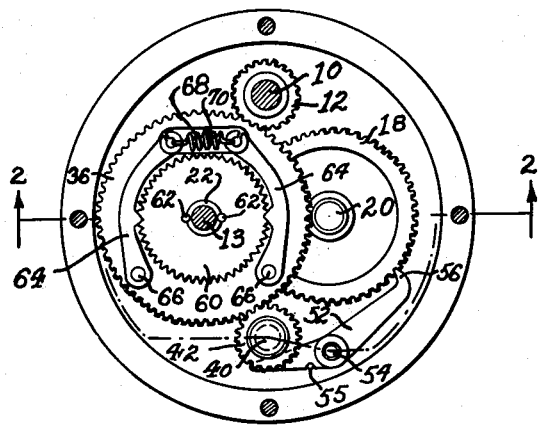
Figure 1 is a plan view of a portion of the actuator mechanism.

Referring now to Figure 1 of the drawings, reference numeral 10 designates the main drive shaft which is adapted to be driven by an electric motor 11. The shaft 10 may, for example, be connected directly to the armature of the motor and is provided with a small pinion 12 which is arranged to engage the teeth of a fiber spur gear 14 journalled on a shaft 13 supported by the end plates 15 of the gear housing 17. The fiber gear 14 is adapted to drive the pinion 16 through a clutch mechanism to be described more fully hereinafter. The pinion 16 in turn drives a spur gear 18 which for purposes of illustration has been shown directly connected to a driven shaft 20 and which is adapted to actuate the control surfaces (not shown) of a plane. In order to simplify this disclosure, the pinion 16 has been shown directly connected to the gear 18 on the driven shaft, whereas in actual practice further reduction gearing may be provided between the gear 18 and the shaft 20, so as to provide additional gear reduction, but since the number of reduction gears provided in the gear train does not form a part of this invention, we have shown the gear 18 directly connected to the shaft 20.

Figure 3:
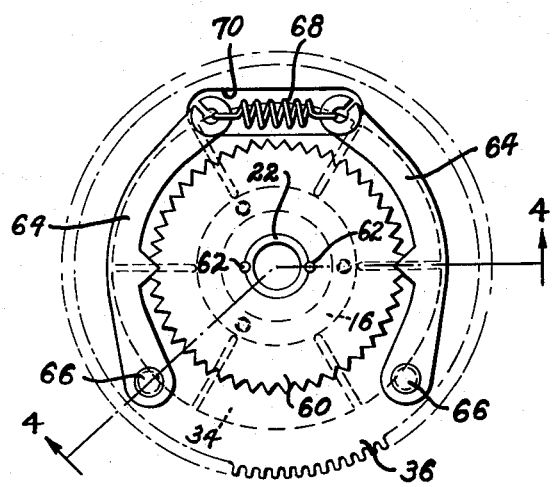
Figure 3 is an enlarged sectional view showing the clutch and the means for adjusting the clutch.
Figure 4:
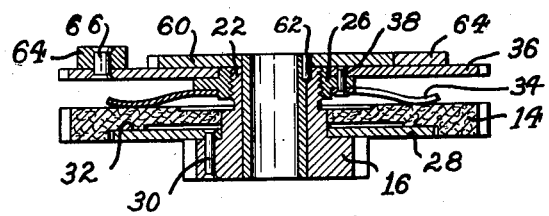
Figure 4 is a plan view of a clutch assembly.

The clutch arrangement is best shown in Figures 3 and 4 wherein reference numeral 22 designates a projecting hub portion which is formed integrally with the pinion 16 and is provided with external threads which are adapted to engage complementary threads on a nut or follower 26. A clutch plate 28, which is secured to the pinion 16 by means of rivets 30, is arranged to frictionally engage a portion of one side of the fiber gear 14, as shown at 32. The pressure between the surfaces at 32 determines the amount of force which may be transmitted from the motor 11 to the pinion 16 and finally the driven shaft 20. In order to adjust the force between the clutch plate 28 and the fiber gear 14, there is provided a spring disc 34 which is secured to the nut 26 and the spring pressure adjusting gear 36 by means of rivets 38.

By virtue of the above described arrangement, it is apparent that relative rotation between the nut 26 and the hub portion 22 of the pinion 16 will serve to adjust the pressure with which the spring 34 holds the fiber gear 14 against the clutch plate 28. As will be explained more fully hereinafter, the nut 26 normally rotates in unison with the hub portion 22, so that the frictional contact between the spring 34 and the gear 14 also assists in driving the gear 14. Thus, the spring 34 in effect serves as a second clutch element arranged in driving engagement with the one side of the fiber gear 14.

Figure 2:
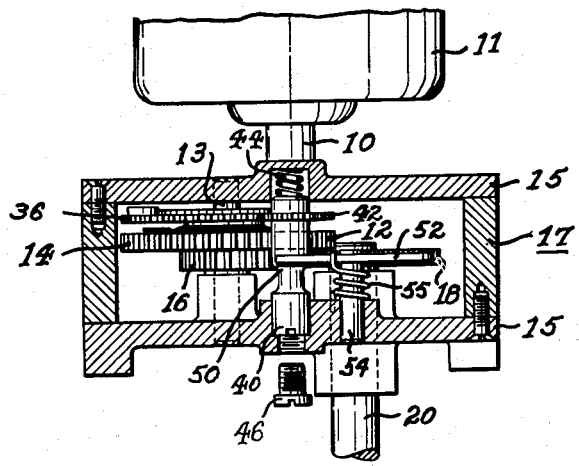
Figure 2 is an elevational view of a portion of the actuator mechanism.
Figure 5:
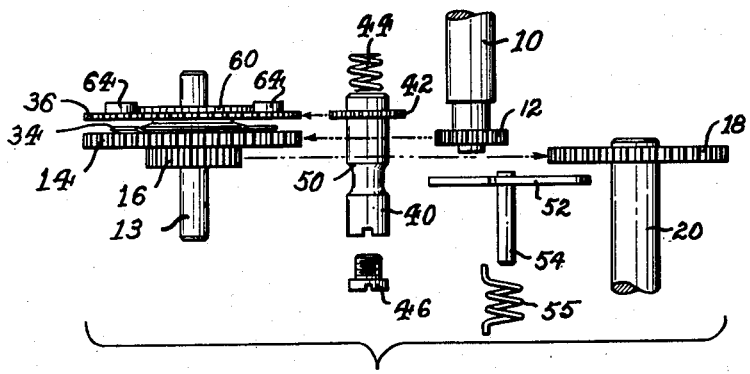
Figure 5 is an exploded view showing a portion of the actuator mechanism.

In adjusting the position of the nut 26 on the threaded hub portion 22, it is necessary to rotate the one while the other is being held against rotation. The problem of preventing the one from rotating while the other is adjusted has been solved in the following manner. As best shown in Figures 2 and 5, we have provided a spring pressed plunger 40 which has attached thereto a pinion 42 which is adapted to mesh with the teeth on the spring pressure adjusting gear 36 in the one position of the plunger 40. The plunger 40 and its associated pinion 42 are normally biased downwardly, as viewed in Figure 2, by means of a spring 44 but is held in its upper position with the pinion 42 out of engagement with the spring pressure adjusting gear 36 by means of the cap screw 46 which must be removed before it is possible to adjust the spring pressure of the clutch. The lower end of the plunger 40 is slotted, as shown, whereby a screwdriver or the like may be used for rotating the same. Upon removal of the cap screw 46, the plunger 40 moves downwardly, as shown in Figure 2, until the pinion 42 meshes with the gear 36, at which time a screwdriver or the like may be inserted through the threaded aperture 45 for rotating the plunger 40 and its associated pinion 42. However, rotation of the pinion 42 merely tends to rotate the clutch assembly without causing any relative rotation between the nut 26 and the threaded hub portion 22 and consequently it is necessary to provide some means for preventing rotation of the hub portion 22 when the adjusting gear 36 is rotated by the plunger 40. In order to prevent rotation of the pinion 16, there is provided on the plunger 40 a cam surface 50 which engages the one arm of a locking dog 52 which is pivotally supported on a fixed pin 54, as best shown in Figures 1 and 5. The other end of the locking dog 52 is provided with a projecting finger 56 which is adapted to engage between two of the teeth on the gear 18, so as to lock the gear 18 against rotation. Since the gear 18 is arranged in meshing engagement with the pinion 16, it is apparent that the pinion 16 is also locked against rotation when the plunger 40 moves downwardly.

By virtue of this construction, rotation of the plunger 40 then imparts rotation to the spring pressure adjusting gear 36 carried by the nut 26 while the hub 22 and its associated pinion 16 are held against rotation. Thus, by removing the cap screw 46, the spring 44 moves the pinion 42 into meshing engagement with the gear 36. At the same time that the pinion 42 moves into engagement with the gear 36, the locking dog 52 locks the hub 22 against rotation. Upon having adjusted the pressure with which the spring 34 engages the one side of the gear 14, the cap screw 46 is replaced and this automatically shoves the plunger 40 upwardly so that the pinion 42 no longer engages the gear 36 and the cam 50 no longer forces the locking dog 52 into locking engagement with the teeth of the gear 18. A spring means 55 biases the locking dog 52 out of locking engagement at all times, but the effect of the spring means 55 is overcome by the force of the spring 44 acting through the cam surface 50 when the cap screw 46 is removed.

In order to prevent relative rotation between the nut 26 and the hub portion 22 during operation of the device, there is secured to the hub portion 22 a ratchet wheel 60 provided with ratchet teeth on its periphery, as shown in Figures 1, 3 and 4. This ratchet wheel is staked to hub 22 by means of the pins 62, as best shown in Figures 1 and 3. The adjusting gear 36 is provided with a pair of spring loaded locking dogs 64 which are pivotally secured at their ends to the gear 36 by means of the pins 66. A coil spring 68 is hooked between the free ends of the locking dogs 64, so as to bias the same firmly into engagement with the ratchet teeth on the periphery of the ratchet wheel 60. The force with which the locking dogs 64 engage the ratchet wheel 60 is such that no relative rotation is permitted except when the plunger 40 is forcefully rotated during the spring pressure adjusting operation.

As best shown in Figure 4, the gear 36 has a slot 70 provided therein, so as to make room for the spring 68. This latter feature increases the compactness of the device considerably without unduly weakening the construction.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In an actuator for the control surfaces of a plane, the combination, gear means having a friction surface, said gear means having a threaded hub portion, a spur gear having a second friction surface arranged in frictional engagement with said first named friction surface, spring means for urging said surfaces into frictional engagement, said spring means including a threaded portion engaging the threads of said threaded hub portion whereby relative rotation between said spring means and said hub portion varies the spring pressure, means for producing relative rotation between said spring means and said hub portion, said last named means comprising a reciprocating plunger having means for rotating said spring means, and a locking means for preventing rotation of said gear means, said plunger having cam means for moving said locking means into locking position during rotation of said spring means in response to predetermined reciprocation of said plunger.

2. In an actuator for the control surfaces of a plane, the combination, a pinion, a friction disc arranged to operate in unison with said pinion, said pinion having a threaded hub portion, a spur gear having a portion arranged in frictional engagement with said friction disc, spring means for urging said spur gear into frictional engagement with said friction disc, said spring means including a threaded support engaging the threads of said threaded hub portion whereby relative rotation between said support and said hub portion varies the spring pressure, and means for rotating said threaded support on said hub portion including means for preventing rotation of said hub portion during rotation of said threaded support.

3. In an actuator for the control surfaces of a plane, the combination, a motor having a drive shaft, a driven shaft, and power transmitting means from said drive shaft to said driven shaft, said power transmitting means comprising a pair of elements provided with opposed friction surfaces, means for supporting one of said elements for axial movement relative to the other of said elements in response to rotation of one of said elements relative to the other of said elements, first mechanism for rotating one of said elements, second mechanism for preventing rotation of the other of said elements, and actuator means for operating said mechanisms in unison whereby upon rotation of one of said elements the other of said elements is prevented from rotating.

4. In an actuator for the control surfaces of a plane, the combination, a motor having a drive shaft, a driven shaft, and power transmitting means from said drive shaft to said driven shaft, said power transmitting means comprising a pair of elements provided with opposed friction surfaces, means for supporting one of said elements for axial movement relative to the other of said elements in response to rotation of one of said elements relative to the other of said elements, first mechanism for rotating one of said elements, second mechanism for preventing rotation of the other of said elements, and actuator means for operating said mechanisms in unison whereby upon rotation of one of said elements the other of said elements is prevented from rotating, said first mechanism comprising a pinion carried by said actuator means.

5. In an actuator for the control surfaces of a plane, the combination, a motor having a drive shaft, a driven shaft, and power transmitting means from said drive shaft to said driven shaft, said power transmitting means comprising a pair of elements provided with opposed friction surfaces, means for supporting one of said elements for axial movement relative to the other of said elements in response to rotation of one of said elements relative to the other of said elements, first mechanism for rotating one of said elements, second mechanism for preventing rotation of the other of said elements, and actuator means for operating said mechanisms in unison whereby upon rotation of one of said elements the other of said elements is prevented from rotating, said first mechanism comprising a pinion carried by said actuator means, said second mechanism comprising means operated by said actuator means for preventing rotation of said driven shaft.

6. In an actuator for the control surfaces of a plane, a first gear, a friction element arranged to operate in unison with said first gear, said first gear having a threaded portion, a second gear having a portion arranged in frictional engagement with said friction element, a spring assembly for urging said second gear into frictional engagement with said friction element, said spring assembly including a threaded support for engaging said first named threaded portion whereby relative rotation between said spring assembly and said first named threaded portion varies the spring pressure, a spur gear carried by said threaded support, a ratchet wheel carried by said first named threaded portion, pawl means carried by said spur gear, and means for biasing said pawl means into engagement with said ratchet wheel so as to resist relative rotation between said first named threaded portion and said threaded support.

7. In an actuator for the control surfaces of a plane, a first gear, a friction element arranged to operate in unison with said first gear, said first gear having a threaded portion, a second gear having a portion arranged in frictional engagement with said friction element, a spring assembly for urging said second gear into frictional engagement with said friction element, said spring assembly including a threaded support for engaging said first named threaded portion whereby relative rotation between said spring assembly and said first named threaded portion varies the spring pressure, a spur gear carried by said threaded support, a ratchet wheel carried by said first named threaded portion, pawl means carried by said spur gear, and means for biasing said pawl means into engagement with said ratchet wheel so as to resist relative rotation between said first named threaded portion and said threaded support, said pawl means comprising a pair of pawls disposed on opposite sides of said ratchet wheel.

8. In an actuator for the control surfaces of a plane, a housing, a first gear, means for rotatably supporting said first gear within said housing, a friction element disposed within said housing and arranged to operate in unison with said first gear, said first gear having a threaded portion, a second gear having a portion arranged in frictional engagement with said friction element, a spring assembly for urging said second gear into frictional engagement with said friction element, said spring assembly including a threaded portion whereby relative rotation between said spring assembly and said first named threaded portion varies the spring pressure, a spur gear within said housing and carried by said threaded support, a ratchet wheel carried by said first named threaded portion, pawl means carried by said spur gear, and spring means for biasing said pawl means into engagement with said ratchet wheel so as to resist relative rotation between said first named threaded portion and said threaded support, said pawl means comprising a pair of pawls disposed to engage opposite edges of said ratchet wheel, said spring means comprising a coil spring connecting the free ends of said pawls so as to hold said pawls against the periphery of said ratchet wheel, said spur gear having a recess formed in its face for receiving said coil spring.

9. In an actuator for a control surface of a plane, the combination, a first pinion, a friction element arranged to operate in unison with said first pinion, said first pinion having a threaded hub portion, a first spur gear having a portion arranged in frictional engagement with said friction element, a spring assembly for urging said first spur gear into frictional engagement with said friction element, said spring assembly including a threaded support for engaging said first named threaded portion whereby relative rotation between said spring assembly and said first named threaded portion varies the spring pressure, a second spur gear secured to said threaded support, yieldable means for resisting relative rotation between said threaded support and said first named threaded portion, and means for forcing relative rotation between said threaded support and said first named threaded portion, said last named means comprising a reciprocating plunger having a second pinion secured thereto for engaging said second spur gear, spring means for biasing said second pinion into engagement with said second named spur gear, and means for overcoming the force of said last named spring means so as to disengage said second named pinion from said second named spur gear.

10. In an actutator for a control surface of a plane, the combination, a first pinion, a friction element arranged to operate in unison with said first pinion, said first pinion having a threaded hub portion, a first spur gear having a portion arranged in frictional engagement with said friction element, a spring assembly for urging said first spur gear into frictional engagement with said friction element, said spring assembly including a threaded support for engaging said first named threaded portion whereby relative rotation between said spring assembly and said first named threaded portion varies the spring pressure, a second spur gear secured to said threaded support, yieldable means for resisting relative rotation between said threaded support and said first named threaded portion, means for forcing relative rotation between said threaded support and said first named threaded portion, said last named means comprising a reciprocating plunger having a second pinion secured thereto for engaging said second spur gear, spring means for biasing said second pinion into engagement with said second named spur gear, and means for overcoming the force of said last named spring means so as to disengage said second named pinion from said second named spur gear, and means operated in response to reciprocation of said plunger for preventing rotation of said threaded hub portion when said second pinion is in engagement with said second spur gear.

11. In a power transmitting device, a first gear, a friction element arranged to operate in unison with said first gear, said first gear having a threaded portion, a second gear having a portion arranged in frictional engagement with said friction element, a spring assembly for urging said second gear into frictional engagement with said friction element, said spring assembly including a threaded support for engaging said first named threaded portion whereby relative rotation between said spring assembly and said first named threaded portion varies the spring pressure, a gear element secured to said support for rotating said support, pinion means arranged to engage said gear element for inducing relative rotation between said threaded support and said first named threaded portion, and means for shifting said pinion means out of engagement with said gear element.

References Cited in the file of this patent

UNITED STATES PATENTS

| Number | Name | Date |
|---|---|---|
| 101,940 | Tatham | Apr. 2, 1870 |
| 1,575,637 | Neth | Mar. 9, 1926 |
| 1,789,169 | Chilton | Jan. 13, 1931 |
| 2,053,376 | Sebire | Sept. 8, 1936 |
| 2,111,143 | Geldhof | Mar. 15, 1938 |
| 2,123,744 | Ramsey | July 12, 1938 |
| 2,359,661 | Moody | Oct. 3, 1944 |
| 2,436,750 | Gray | Feb. 24, 1948 |
| 2,564,103 | Gallagher | Apr. 14, 1951 |